United States Patent
Wagner et al.

(10) Patent No.: US 6,700,221 B2
(45) Date of Patent: Mar. 2, 2004

(54) ELECTRONIC UNIT AND METHOD FOR DETECTING A POLARITY INVERSION OF THE ONBOARD POWER SUPPLY VOLTAGE IN MOTOR VEHICLES

(75) Inventors: Armin Wagner, Karlsfeld (DE); Christina Seidel, Munich (DE); Christoph Luthe, Munich (DE); Hans-Ulrich Stahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 74 days.

(21) Appl. No.: 09/904,586

(22) Filed: Jul. 16, 2001

(65) Prior Publication Data
US 2002/0005666 A1 Jan. 17, 2002

(30) Foreign Application Priority Data
Jul. 15, 2000 (DE) .......................... 100 34 442

(51) Int. Cl.[7] ................................ H02H 7/18
(52) U.S. Cl. ............. 307/10.7; 320/165; 320/DIG. 15; 320/DIG. 20
(58) Field of Search ................ 320/165, FOR 124, 320/DIG. 15, DIG. 20, 134, 128; 307/10.7, 66; 361/23, 246; 123/197.3

(56) References Cited
U.S. PATENT DOCUMENTS
4,390,792 A * 6/1983 Meyer et al. ............. 307/10.7
5,486,750 A * 1/1996 Walborn et al. ............ 320/159
5,965,998 A * 10/1999 Whiting et al. ............. 320/165

FOREIGN PATENT DOCUMENTS
| DE | 40 21 667 A1 | 7/1990 |
| DE | 42 41 822 A1 | 12/1992 |
| DE | 196 49 392 A1 | 11/1996 |
| DE | 197 19 919 A1 | 5/1997 |

* cited by examiner

Primary Examiner—Shawn Riley
(74) Attorney, Agent, or Firm—Crowell & Moring LLP

(57) ABSTRACT

An electronic unit in a motor vehicle has a connection for the negative onboard power supply voltage and a connection for the positive onboard power supply voltage, as well as an internal electric supply unit that can be used independently of the polarity of the onboard power supply voltage and independently of the onboard power supply voltage. The unit includes a function block which compares the actual voltage at the connection for the negative onboard power supply voltage with the actual voltage at the connection for the positive onboard power supply voltage. A polarity inversion of the onboard power supply voltage is detected (and a storage of the polarity inversion detection data is caused) if the actual voltage at the connection for the negative onboard power supply voltage is higher than the actual voltage at the connection for the positive power supply voltage, or if the respective actual voltages exceed preset reference values.

18 Claims, 1 Drawing Sheet

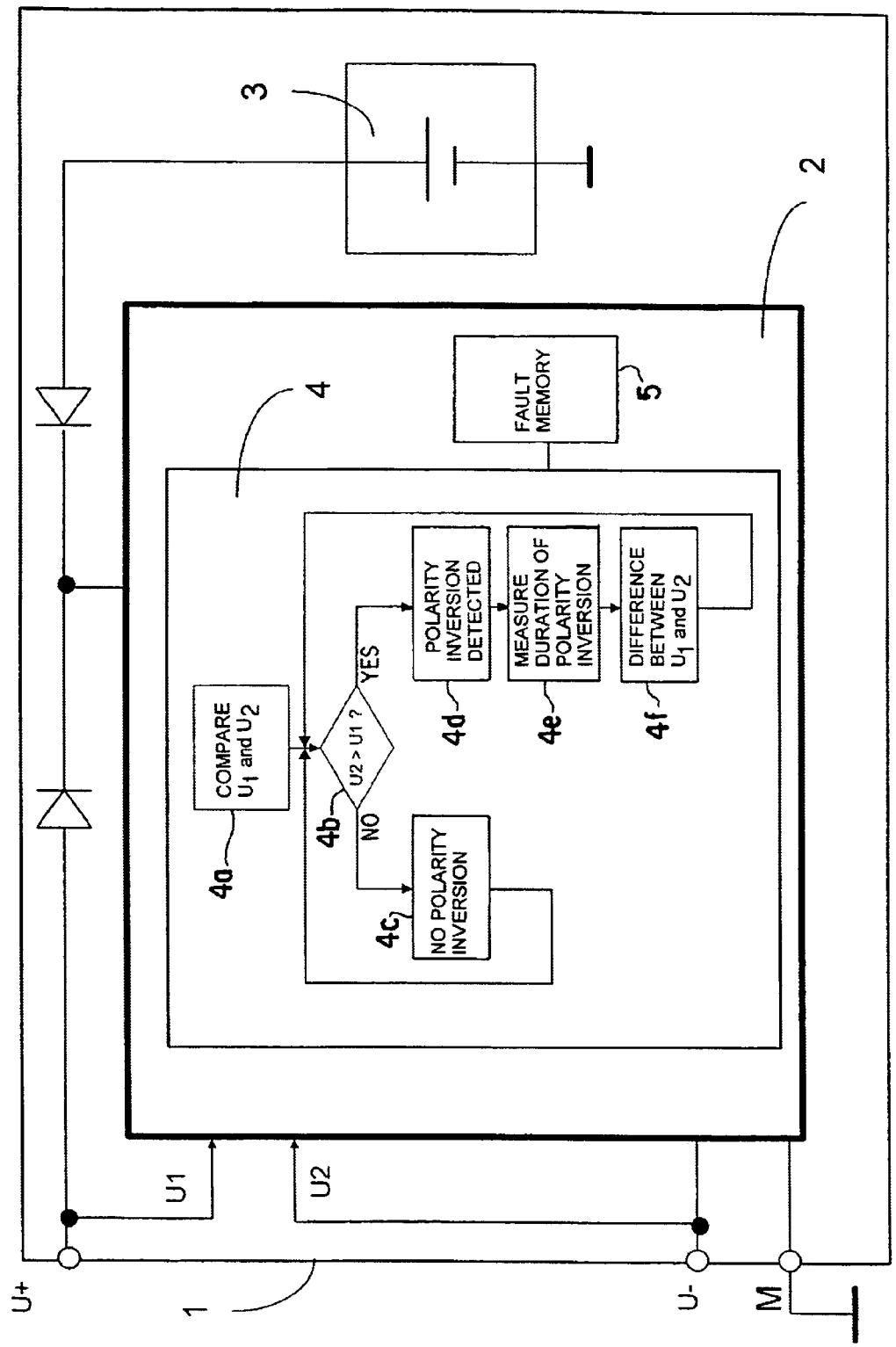

ELECTRONIC UNIT AND METHOD FOR DETECTING A POLARITY INVERSION OF THE ONBOARD POWER SUPPLY VOLTAGE IN MOTOR VEHICLES

BACKGROUND AND SUMMARY OF THE INVENTION

This application claims the priority of 100 34 442.9, filed Jul. 15, 2000, the disclosure of which is expressly incorporated by reference herein.

The invention relates to an electronic unit in a motor vehicle which can detect and protect against polarity inversions in the vehicle electric power supply.

Many electronic units are found in motor vehicles, particularly control units for various motor vehicle functions. In the event of a polarity inversion of the onboard power supply voltage (for example, by an unintentional exchange of the battery pole connections during an external start), very high electric currents may flow. The longer these currents flow, the greater the damage which may occur on control units and/or on other electric and electronic components in the motor vehicle. Heretofore, no measures have been known checking a polarity inversion, and particularly the extent of possible damage by a polarity inversion, in the shop.

It is an object of the present invention to provide a method and apparatus for detecting a polarity inversion of the onboard power supply voltage.

This object is achieved by the method and apparatus according to the invention, in which the voltages present at the connections for the negative and positive on-board power supplies are compared with each other or with reference values. A polarity inversion is detected when the voltage at the negative power supply is greater than that at the positive power supply, or alternatively when the voltage at the negative power supply is greater than a reference value, or the voltage at the positive power supply is less than a reference value. In the event of any such occurrence a polarity inversion is recognized and stored.

Electronic units in motor vehicles, particularly in the form of control units for motor vehicle functions, normally have a connection for the negative onboard power supply voltage, or for connecting to the vehicle mass or the negative battery pole, and a connection for the positive onboard power supply voltage or for connecting to the positive battery pole of a motor vehicle battery. A polarity inversion of the onboard power supply voltage takes place, for example, if, during an external starting attempt, the battery pole connections are exchanged. The positive onboard power supply voltage is then applied to the connection for the negative onboard power supply voltage and vice versa.

By means of the functional block according to the invention, the actual voltage at the connection for the negative onboard power supply voltage is therefore compared with the actual voltage at the connection for the positive onboard power supply voltage. A polarity inversion is detected and the polarity inversion detection is stored if the actual voltage at the connection for the negative onboard power supply voltage is higher than the actual voltage at the connection for the positive onboard power supply voltage.

In a first alternative, the actual voltage at the connection for the negative onboard power supply voltage is compared in the functional block with a defined upper limit value; it is measured, for example, in comparison to a mass uncoupled from the negative onboard power supply voltage. A polarity inversion is detected and the polarity inversion detection is stored, if the actual voltage at the connection for the negative onboard power supply voltage is higher than the upper limit value.

In a second alternative, the actual voltage at the connection for the positive onboard power supply voltage is compared in the functional block with a defined lower limit value; it is measured, for example, also in comparison to a mass uncoupled from the negative onboard power supply voltage. A polarity inversion is detected, and the polarity inversion detection is stored, if the actual voltage at the connection for the positive onboard power supply voltage is lower than the lower limit value.

The three possibilities can also be combined with one another in a meaningful manner. The polarity inversion detection is filed either in the electronic unit itself, for example, in a fault memory, or is emitted, for example, as bus information, to another unit for central storage.

It is particularly important with respect to all three possibilities that the unit has an internal electrical supply unit which can be used independently of the polarity of the onboard power supply voltage and completely independently of the onboard power supply voltage. Such a supply unit may, for example, be a booster battery, an accumulator, a power cap or another capacitor or a circuit which can supply an electrical supply independently of the polarity of the onboard power supply voltage. The reason is that this supply unit must supply the electronic unit with electrical power upon the occurrence of a polarity inversion. A control unit which already contains such a supply unit is preferably used for the electronic unit according to the invention. Such control units are used, for example, in the case of theft warning systems which emit an alarm when the battery is branched off. A supply unit provided for this purpose may optionally be used for the invention.

Preferably, the duration of the polarity inversion is also detected and stored. Also, it is preferable that the actual voltage at the connection for the negative onboard power supply voltage and/or the positive onboard power supply voltage, and/or the difference between the two can be detected at the point in time when the polarity inversion starts (or for the entire duration of the polarity inversion) and can be stored.

By means of the invention, a polarity inversion detection can be queried routinely, for example, by a diagnostic unit in the shop. This also increases the safety and the availability of the vehicles as a result of an early detection of preliminary damage caused by polarity inversion.

Other objects, advantages and novel features of the present invention will become apparent from the following detailed description of the invention when considered in conjunction with the accompanying drawings.

BRIEF DESCRIPTION OF THE DRAWINGS

The FIGURE of the drawing is a schematic diagram of an electronic unit according to the invention.

DETAILED DESCRIPTION OF THE DRAWINGS

The drawing illustrates an electronic unit 1 (such as a control unit) for motor vehicles which has a connection U− for the negative onboard power supply voltage and a connection U+ for the positive onboard power supply voltage. The unit 1 also includes an internal electric supply unit 3 and a functional block 4. The supply unit 3, may be for example, an accumulator which, in the event of a polarity inversion, alone provides the electric supply of the unit 1. The functional block 4 is part of an electronic system 2 which also triggers other functions, such as the alarm when a vehicle battery is branched off while the vehicle is locked. The electronic system 2 receives as input signals the actual voltage U2 at connection U− for the negative onboard power supply voltage and the actual voltage U1 at connection U+ for the positive onboard power supply voltage. The electronic system 2 is also connected with a mass M uncoupled from the negative onboard power supply voltage. The voltages U1 and U2 are compared with one another in step 4a of the functional block 4. If $U_1$ is greater than $U_2$, no inversion is detected (Step 4c), and the process returns to step 4b. On the other hand, a polarity inversion of the onboard power supply voltage is detected (Sep 4d), and a storage of the polarity inversion detection is caused, if the actual voltage U2 at the connection U− for the negative onboard power supply voltage is higher than the actual voltage U1 at the connection U+ for the positive onboard power supply voltage (Step 4b). In this case, the voltages U1 and U2 do not have to be measured relative to the mass M uncoupled from the negative onboard power supply voltage.

If, in a first alternative (not shown here), in the functional block 4, the voltage U2 is compared with a defined upper limit value, or if, in a second alternative (not shown here), in the functional block 4, the voltage U1 is compared with a defined lower limit value, the voltages U1 and U2 are preferably measured in comparison to the mass M uncoupled from the negative onboard power supply voltage. Polarity inversion is detected and the polarity inversion detection is stored if the voltage U2 is higher than the upper limit value or if the voltage U1 is lower than the lower limit value.

Furthermore, the duration of the polarity inversion (Step 4e) as well as the difference between the actual voltage U2 at the connection U− for the negative onboard power supply voltage and the actual voltage U1 at the connection U+ for the positive onboard power supply voltage (Step 4F) are detected and stored.

For storing all polarity-inversion-related data, a fault memory 5 can be used in the electronic system 2, which fault memory can be read by means of conventional diagnostic units in the shop.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic unit for a motor vehicle having an onboard power supply, comprising:
    a connection for a negative onboard vehicle power supply voltage;
    a connection for a positive onboard vehicle power supply voltage;
    an internal electrical supply unit which can be supply power for operation of the electronic unit, independently of the onboard power supply or its polarity; and
    a functional unit which compares actual voltage present at the connection for the negative onboard power supply voltage with actual voltage present at the connection for the positive onboard power supply voltage, and detects and causes storage of data concerning a polarity inversion of the onboard power supply voltage if the actual voltage at the connection for the negative onboard power supply voltage is higher than the actual voltage at the connection for the positive onboard power supply voltage.

2. An electronic unit for a motor vehicle having an onboard power supply, comprising:
    a connection for a negative onboard power supply voltage;
    a connection for a positive onboard power supply voltage;
    an internal electrical supply unit which can be used independently of the onboard power supply or its polarity; and
    a functional unit which compares actual voltage present at the connection for the negative onboard power supply voltage with a defined upper limit value, and detects and causes storage of data concerning a polarity inversion of the onboard power supply voltage if the actual voltage at the connection for the negative onboard power supply voltage is higher than the defined upper limit value.

3. An electronic unit in a motor vehicle having an onboard power supply, comprising:
    a connection for a negative onboard power supply voltage;
    a connection for a positive onboard power supply voltage;
    an internal electrical supply unit which can be used independently of the onboard power supply or its polarity; and
    a functional unit which compares actual voltage present at the connection for the positive onboard power supply voltage with a defined lower limit value, and detects and causes storage of data concerning a polarity inversion of the onboard power supply voltage if the actual voltage at the connection for the positive onboard power supply voltage is lower than the defined lower limit value.

4. The electronic unit according to claim 1, wherein the functional unit has devices which detect and cause storage of a duration of the polarity inversion.

5. The electronic unit according to claim 2, wherein the functional unit has devices which detect and cause storage of a duration of the polarity inversion.

6. The electronic unit according to claim 3, wherein the functional unit has devices which detect and cause storage of a duration of the polarity inversion.

7. The electronic unit according to claim 1, wherein the functional unit has devices which cause storage of one of:
    actual voltage at the connection for the negative onboard power supply voltage;
    actual voltage at the connection for the positive onboard power supply voltage; and
    the difference between the actual voltage at the connection for the negative onboard power supply voltage and the actual voltage at the connection for the positive onboard power supply voltage.

8. A method of detecting a polarity inversion of onboard power supply voltages present at positive and negative input terminals of an electronic unit in a motor vehicle, comprising:
    detecting magnitude of voltages present at said positive and negative terminals of said electronic unit;
    comparing said detected voltages; and
    detecting a polarity inversion of the onboard power supply when voltage present at the negative input terminal is greater than voltage present at the positive terminal.

9. A method of detecting a polarity inversion of onboard power supply voltages present at positive and negative input terminals of an electronic unit in a motor vehicle, comprising:

detecting magnitude of voltages present at said positive and negative terminals of said electronic unit;

comparing voltage present at the negative input terminal with a defined upper limit value;

detecting a polarity inversion of the onboard power supply when voltage present at the negative input terminal exceeds the defined upper limit value.

10. A method of detecting a polarity inversion of onboard power supply voltages present at positive and negative input terminals of an electronic unit in a motor vehicle, comprising:

detecting magnitude of voltages present at said positive and negative terminals of said electronic unit;

comparing voltage present at positive input terminal with a defined lower limit value; and detecting a polarity inversion of the onboard power supply when voltage present at the positive input terminal is lower than said defined lower limit value.

11. A method of protecting an electronic unit in a vehicle, said electronic unit having positive and negative electrical input terminals for connection to an on-board power supply of the vehicle, against a polarity inversion of the onboard power supply comprising:

providing said electronic unit with an internal electric supply which is independent of the onboard power supply;

measuring voltages present at at least one of said electrical input terminals;

comparing measured voltages with a reference value;

detecting a polarity inversion of said onboard power supply based on a result of said comparing; and said internal electric power supply providing electric power to operate said electronic unit in response to detection of a polarity inversion of said onboard power supply.

12. The method according to claim 11, wherein said comparing step comprises at least one of:

comparing voltages present at said positive and negative input terminals with each other;

comparing voltage present at said negative terminal with a defined upper limit value; and comparing voltage present at said positive terminal with a defined lower limit value;

wherein a polarity inversion of the onboard power supply is detected when any of the following is true, voltage present at the negative input terminal exceeds voltage present at the positive input terminal;

voltage present at the negative input terminal exceeds a defined upper limit value; and voltage present at the positive input terminal is less than a defined lower limit value.

13. The electronic unit for a motor vehicle according to claim 1, wherein the functional unit has devices that detect and cause storage of data concerning at least one of actual positive or negative onboard power supply voltage and magnitude of a difference between said positive and negative onboard power supply voltages, during or at a commencement of a polarity inversion.

14. The electronic unit for a motor vehicle according to claim 1, wherein said functional unit includes a fault memory for storing said data concerning a polarity inversion in a form which is readable subsequently by a vehicle diagnostic unit.

15. The electronic unit for a motor vehicle according to claim 13, wherein said functional unit includes a fault memory for storing said data concerning a polarity inversion in a form which is readable subsequently by a vehicle diagnostic unit.

16. A method of operating an electronic unit in a vehicle having an onboard power supply, said electronic unit having terminals for receiving positive and negative voltages from said onboard power supply, and an internal electrical supply unit which can be actuated to supply power for operation of the electronic unit independently of said onboard power supply; said method comprising:

comparing actual voltage present at at least one of said positive or negative voltage connections with a second voltage value;

detecting occurrence of a polarity inversion of the onboard power supply based on a result of said comparison;

during a detected polarity inversion, causing said internal electrical supply unit to supply power for operation of said electronic unit independently of said onboard power supply; and storing data characterizing said polarity inversion in a medium that is readable by a vehicle diagnostic unit.

17. The method according to claim 16, wherein:

said comparing step comprises comparing voltages present at said terminals with each other; and said detecting step comprises detecting a polarity inversion when the actual voltage present at the terminal for receiving negative voltage is higher than the voltage present at the terminal for receiving positive voltage.

18. The method according to claim 17, wherein said data characterizing the polarity inversion comprise at least one of:

duration of said polarity inversion;

actual positive or negative onboard power supply voltage during or at commencement of said polarity inversion; and magnitude of a difference between said voltages present at said terminals during or at commencement of the power inversion.

* * * * *